(12) United States Patent
Itaki

(10) Patent No.: US 7,233,370 B2
(45) Date of Patent: Jun. 19, 2007

(54) METHOD FOR CORRECTING FOR DISTORTION OF PROJECTED IMAGE, PROGRAM FOR CORRECTING IMAGE DISTORTION, AND PROJECTION-TYPE IMAGE DISPLAY DEVICE

(75) Inventor: Youichi Itaki, Tokyo (JP)

(73) Assignee: NEC Viewtechnology, Ltd., Tokyo (JP)

( * ) Notice: Subject to any disclaimer, the term of this patent is extended or adjusted under 35 U.S.C. 154(b) by 642 days.

(21) Appl. No.: 10/408,097

(22) Filed: Apr. 8, 2003

(65) Prior Publication Data

US 2003/0189675 A1    Oct. 9, 2003

(30) Foreign Application Priority Data

Apr. 8, 2002    (JP)    ............... 2002-105613

(51) Int. Cl.
  *H04N 3/22*    (2006.01)
(52) U.S. Cl. ................. 348/745; 348/746; 353/70
(58) Field of Classification Search ........ 348/745–747, 348/189, 191, 383, 739, 576, 577, 601, 177–179, 348/806; 353/69, 70; 345/904, 647; 315/370
See application file for complete search history.

(56) References Cited

U.S. PATENT DOCUMENTS

| | | | | |
|---|---|---|---|---|
| 5,091,773 A | * | 2/1992 | Fouche et al. ............... 348/806 |
| 5,247,358 A | * | 9/1993 | Richards ...................... 348/191 |
| 5,465,121 A | * | 11/1995 | Blalock et al. ............. 348/744 |
| 5,483,259 A | * | 1/1996 | Sachs ........................... 345/600 |
| 5,764,311 A | * | 6/1998 | Bonde et al. ................ 348/746 |
| 5,966,124 A | * | 10/1999 | Devine ........................ 715/764 |
| 5,990,940 A | * | 11/1999 | Hashimoto et al. .......... 348/184 |
| 6,361,171 B1 | | 3/2002 | Ejiri et al. |
| 6,400,418 B1 | * | 6/2002 | Wakabayashi ............... 348/707 |
| 6,540,365 B1 | * | 4/2003 | Fujiwara et al. .............. 353/69 |
| 6,592,228 B1 | * | 7/2003 | Kawashima et al. ........ 353/101 |
| 6,609,797 B2 | * | 8/2003 | Ejiri et al. ..................... 353/69 |
| 6,784,947 B2 | * | 8/2004 | Kuramochi et al. ......... 348/806 |
| 6,995,810 B2 | * | 2/2006 | Melton ........................ 348/745 |
| 2003/0210381 A1 | | 11/2003 | Itaki |
| 2004/0150617 A1 | | 8/2004 | Tamura |

FOREIGN PATENT DOCUMENTS

| | | |
|---|---|---|
| JP | H03-33893 A | 2/1991 |
| JP | 2000-81601 A | 3/2000 |
| JP | 2001-69433 A | 3/2001 |
| JP | 2002-6391 A | 1/2002 |
| JP | 2002-44571 A | 2/2002 |

\* cited by examiner

*Primary Examiner*—Victor R. Kostak
(74) *Attorney, Agent, or Firm*—Sughrue Mion, PLLC

(57) ABSTRACT

An image distortion correction method is provided which is capable of correcting for distortion of a projected image by designating an arbitrary correction point by using a simple and easy operation without independently providing a display device and/or a pointing device. The distortion correction method includes a first step of displaying first to eighth correction function indicating marks corresponding to first to eighth correction functions to make corrections to first to fourth correction points on a screen, a second step of displaying the first correction function indicating mark corresponding to the first correction function selected by an operator on the screen in a highlighted manner, a third step of moving the first correction point to be corrected by the selected first correction function and to be displayed on the screen according to an instruction of the operator and of calculating a correction parameter corresponding to a moved distance, and a fourth step of correcting for distortion of projected image based on the correction parameter.

14 Claims, 4 Drawing Sheets

22; projected image

22; projected image

METHOD FOR CORRECTING FOR DISTORTION OF PROJECTED IMAGE, PROGRAM FOR CORRECTING IMAGE DISTORTION, AND PROJECTION-TYPE IMAGE DISPLAY DEVICE

BACKGROUND OF THE INVENTION

1. Field of the Invention

The present invention relates to a method for correcting for distortion of a projected image, a program for correcting image distortion, and a projection-type image display device and more particularly to the method for correcting for the distortion of the projected image caused by projecting an image with a projection optical axis being tilted from normal to the screen, the program for correcting image distortion, and the projection-type image display device to which the above method for correcting for the distortion of the projected image is applied.

The present application claims priority of Japanese Patent Application No. 2002-105613 filed on Apr. 8, 2002, which is hereby incorporated by reference.

2. Description of the Related Art

A projection-type image display device (projector), after having modulated light emitted from a light source using a display device such as a liquid crystal panel or a like, projects the modulated light onto a screen through an optical lens to achieve display of an image. In many cases, the projection-type image display device projects the image onto a screen with a projection optical axis being tilted from normal to the screen rather than with the screen and the projection optical axis being intersected at right angles. In this case, for example, a rectangular image is displayed on the screen as the image having been distorted to be trapezoidal.

Then, in the conventional projection-type image display device, corrections for distortion of projected image caused by projecting the image with the projection optical axis being tilted from normal to the screen are made. Technology of a conventional projection-type image display device as described below is disclosed, for example, in Japanese Patent Application Laid-open No. 2002-6391. That is, in the disclosed conventional projection-type image display device, first, a graphic pattern having a rectangular shape or a like is displayed on a display device being placed independent of an existing screen and, at a same time, the same graphic pattern as above is displayed on the screen. Next, vertices (corrected points) of the graphic pattern having the rectangular shape or a like being displayed on the display device are moved and the resulting graphic pattern having a deformed quadrilateral shape are displayed on the display device and, at this time, deformation ratio parameters of the graphic pattern having the deformed quadrilateral shape to its original graphic pattern are calculated and, at the same time, the graphic pattern having the deformed quadrilateral shape is displayed on the screen. If the graphic pattern having the deformed quadrilateral shape being displayed on the screen is the same as the original graphic pattern, the deformation ratio parameters obtained at that time are stored. Then, an image fed from an outside is converted based on the stored deformation ratio parameters and the converted image is displayed on the screen. The technology employed here is hereinafter called a "first conventional technology". Moreover, the first conventional technology includes a free setting mode in which an arbitrary correction point can be designated in the image displayed on the screen.

Moreover, technology for another projection-type image display device as described below is disclosed, for example, in Japanese Patent Application Laid-open No. 2002-44571. That is, the disclosed projection-type image display device is provided with a displaying unit to project any of image each having a regularly polygonal as a test image on a screen, an inputting unit to input coordinates of a distortion-free test image corresponding to coordinates of a specified position defining a distortion contour of the image as the test image projected on the screen, a pointing device to move the specified position defining the distortion contour of the image projected as the test image to coordinates of the distortion-free test image input by using the above inputting unit, and a correcting unit to correct for distortion of projected image based on a relation between the coordinates of the specified position defining the distortion contour of the image projected as the test image and the coordinates corresponding to the distortion-free test image. The technology employed here is hereinafter called a "second conventional technology".

The above first conventional technology is configured based on the premise that, by using an information processing device such as a personal computer or a like, a same image as is to be displayed on a display device making up the information processing device is also projected onto a screen. Therefore, if the above first technology is applied to a case where an image is projected onto a screen singly by a projection-type image display device, a display device is independently required, causing a parts count to be increased. Moreover, in the projection-type image display device employing the second conventional technology, since a pointing device such as a mouse or a like is required, the parts count increases and since a table used to operate the pointing device is also required, the projection-type image display device is limited in its installation place. Furthermore, in the above first and second conventional technologies, direct designation of a position to be corrected by using the pointing device is needed, however, the pointing device itself is constructed based on the premise that an operator manipulates it while seeing a pictorial image being displayed on a display device being put on a same table where the pointing device is being manipulated. Therefore, as in the case of the above first conventional technology, another display has to be placed, independently of a screen and, as in the case of the second conventional technology, the operator has to manipulate the pointing device while seeing an image projected as a test image on a screen being placed apart by several meters. As a result, the first conventional technology has a disadvantage in that a parts count is increased and the second conventional technology also has a disadvantage in that operability of the projection-type image display device is low.

SUMMARY OF THE INVENTION

In view of the above, it is an object of the present invention to provide a distortion correction method capable of correcting for distortion of a projected image caused by projecting an image with a projection optical axis being tilted from normal to a screen by designating an arbitrary correction point by a simple and easy operation without independently providing a display device and/or a pointing device and, a program for correcting image distortion, and a projection-type image display device to which the above method is applied.

According to a first aspect of the present invention, there is provided a method for correcting for distortion of a projected image caused by projecting an image with a projection optical axis being tilted from normal to a screen, the method including:

a first step of displaying a plurality of correction function indicating marks corresponding to a plurality of correction functions to make corrections to specified points as correction objects in the projected image;

a second step of displaying the correction function indicating marks corresponding to the correction functions selected by an operator on the screen in a highlighted manner;

a third step of moving the specified points as correction objects of the selected correction functions on the screen according to an instruction of the operator and of calculating a correction parameter corresponding to a range of the motion; and a fourth step of correcting the projected image based on the correction parameter.

In the foregoing first aspect, a preferable mode is one wherein the projected image is caused by distortion of a rectangular image and wherein the specified points as correction objects are made up of first to fourth specified points each corresponding to each of four corners of the projected image having the distortion and wherein the plurality of correction functions is made up of first to fourth functions each making corrections to each the first to fourth specified points as correction objects and where the plurality of correction function indicating marks is made up of first to fourth correction function indicating marks each being located at each of four corners of a similar figure which is geometrically similar to the projected image and each corresponding to the first to fourth correction functions.

Another preferable mode is one wherein the projected image is caused by trapezoidal distortion of a rectangular image and wherein the specified points as correction objects are made up of first to fourth specified points each corresponding to each of four corners of the projected image having the trapezoidal distortion and wherein the plurality of correction functions is made up of first to fourth functions each making corrections to each the first to fourth specified points as correction objects and where the plurality of correction function indicating marks is made up of first to fourth correction function indicating marks each being located at each of four corners of a similar figure which is geometrically similar to the trapezoidal projected image and each corresponding to the first to fourth correction functions.

Still another preferable mode is one wherein the projected image is caused by trapezoidal distortion of a rectangular image and wherein the specified points as correction objects are made up of first to fourth specified points as correction objects each corresponding to each of first to fourth corners of the trapezoidal projected image and wherein the plurality of correction functions is made up of first to fourth correction functions each making corrections to each of the first to fourth specified points as correction objects, a fifth correction function making corrections to the first and second specified points as correction objects, a sixth correction function making corrections to the second and third specified points as correction objects, a seventh correction function making corrections to the third and fourth specified points as correction objects, and an eighth correction function making corrections to the fourth and first specified points as correction objects and wherein the plurality of correction function indicating marks is made up of first to fourth correction function indicating marks being located at first to fourth corners of a similar figure which is geometrically similar to the trapezoidal projected image and respectively corresponding to each of the first to fourth correction functions, a fifth correction function indicating mark being located at a midpoint between the first corner and the second corner of the similar figure and corresponding to the fifth correction function, a sixth correction function indicating mark being located at a midpoint between the second corner and the third corner of the similar figure and corresponding to the sixth correction function, a seventh correction function indicating mark being located at a midpoint between the third corner and the fourth corner of the similar figure and corresponding to the seventh correction function, and an eighth correction function indicating mark being located at a midpoint between the fourth corner and the first corner of the similar figure and corresponding to the eighth correction function and wherein, in the third step, when the fifth correction function is selected, the first and second specified points as correction objects are simultaneously moved and are displayed on the screen according to an instruction of the operator and a correction parameter corresponding to the range of the motion is calculated and, when the sixth correction function is selected, the second and third specified points as correction objects are simultaneously moved and are displayed on the screen according to an instruction of the operator and a correction parameter corresponding to the range of the motion is calculated and, when the seventh correction function is selected, the third and fourth specified points as correction objects are simultaneously moved and are displayed on the screen according to an instruction of the operator and a correction parameter corresponding to the range of the motion is calculated and, when the eighth correction function is selected, the fourth and first specified points as correction objects are simultaneously moved and are displayed on the screen according to an instruction of the operator and a correction parameter corresponding to the range of the motion is calculated.

An additional preferable mode is one wherein an instruction provided by the operator is executed by cursor keys placed in a housing of an image display device used to project the projected image on the screen or placed in a remote controller and being used to provide instructions for up and down or left and right movements of the projected image.

According to a second aspect of the present invention, there is provided a distortion correction program to have a computer perform a method for correcting for distortion of a projected image caused by projecting an image with a projection optical axis being tilted from normal to a screen, the method including:

a first step of displaying a plurality of correction function indicating marks corresponding to a plurality of correction functions to make corrections to specified points as correction objects in the projected image;

a second step of displaying the correction function indicating marks corresponding to the correction functions selected by an operator on the screen in a highlighted manner;

a third step of moving the specified points as correction objects of the selected correction functions on the screen according to an instruction of the operator and of calculating a correction parameter corresponding to a range of the motion; and a fourth step of correcting the projected image based on the correction parameter.

According to a third aspect of the present invention, there is provided a projection-type image display device including:

an operating unit having cursor keys to provide instructions for up and down or left and right movements;

a displaying unit to provide, on a screen, a plurality of correction function indicating marks corresponding to a plurality of correction functions to make corrections to specified points as correction objects of the projected image used to correct for distortion of a projected image caused by projecting an image with a projection optical axis being tilted from normal to the screen;

a controlling unit to control the displaying unit so as to display the correction function indicating marks corresponding to the correction functions being selected by operations of the operating unit on the screen in a highlighted manner, to move the specified points as correction objects to be corrected by the correction function being selected on the screen according to an instruction provided through operations of the operating unit, and to calculate a correction parameter corresponding to a range of the motion; and a correcting unit to make corrections to the projected image based on the correction parameters.

In the foregoing third aspect, a preferable mode is one wherein the projected image is caused by distortion of a rectangular image and wherein the specified points as correction objects are made up of first to fourth specified points as correction objects each corresponding to each of four corners of the projected image and wherein the plurality of correction functions is made up of first to fourth correction functions to make corrections to the first to fourth specified points as correction objects and wherein the plurality of correction function indicating marks is made up of first to fourth correction function indicating marks each being located at each of four corners of a similar figure which is geometrically similar to the projected image and each corresponding to the first to fourth correction functions.

Another preferable mode is one wherein the projected image is caused by trapezoidal distortion of a rectangular image and wherein the specified points as correction objects are made up of first to fourth specified points as correction objects each corresponding to each of four corners of the trapezoidal projected image and wherein the plurality of correction functions is made up of first to fourth correction functions to make corrections to the first to fourth specified points as correction objects and wherein the plurality of correction function indicating marks is made up of first to fourth correction function indicating marks each being located at each of four corners of a similar figure which is geometrically similar to the trapezoidal projected image and each corresponding to the first to fourth correction functions.

An additional preferable mode is one wherein the projected image is caused by trapezoidal distortion of a rectangular image and wherein the specified points as correction objects are made up of first to fourth specified points as correction objects each corresponding to each of first to fourth corners of the trapezoidal projected image and wherein the plurality of correction functions is made up of first to fourth correction functions each making corrections to each of the first to fourth specified points as correction objects, a fifth correction function to make corrections to the first and second specified points as correction objects, a sixth correction function to make corrections to the second and third specified points as correction objects, a seventh correction function to make corrections to the third and fourth specified points as correction objects, and an eighth correction function to make corrections to the fourth and first specified points as correction objects and wherein the plurality of correction function indicating marks each being located at each of first to fourth corners of a similar figure which is geometrically similar to the trapezoidal projected image and is made up of first to fourth correction function indicating marks each corresponding to each of the first to fourth correction functions, a fifth correction function indicating mark being located at a midpoint between the first corner and the second corner of the similar figure and corresponding to the fifth correction function, a sixth correction function indicating mark being located at a midpoint between the second corner and the third corner of the similar figure and corresponding to the sixth correction function, a seventh correction function indicating mark being located at a midpoint between the third corner and the fourth corner of the similar figure and corresponding to the seventh correction function, and an eighth correction function indicating mark being located at a midpoint between the fourth corner and the first corner of the similar figure and corresponding to the eighth correction function and wherein, in the third step, when the fifth correction function is selected, the first and second specified points as correction objects are simultaneously moved and are displayed on the screen according to an instruction of an operator and a correction parameter corresponding to the range of the motion is calculated and, when the sixth correction function is selected, the second and third specified points as correction objects are simultaneously moved and are displayed on the screen according to an instruction of the operator and a correction parameter corresponding to the range of the motion is calculated and, when the seventh correction function is selected, the third and fourth specified points as correction objects are simultaneously moved and are displayed on the screen according to an instruction of the operator and a correction parameter corresponding to the range of the motion is calculated and, when the eighth correction function is selected, the fourth and first specified points as correction objects are simultaneously moved and are displayed on the screen according to an instruction of the operator and a correction parameter corresponding to the range of the motion is calculated.

With the above configuration, since the image distortion correction method includes a first step of displaying a plurality of correction function indicating marks to be used to make corrections to specified points as correction objects in the projected image on a screen, a second step of displaying a correction function indicating mark corresponding to a correction function selected by an operator on the screen in a highlighted manner, a third step of moving specified points as correction objects by a selected correction function and to be displayed on the screen and of calculating a correction parameter corresponding to the moved distance, and a fourth step of correcting for distortion of projected image based on the correction parameter, it is possible to correct for distortion of image caused by projecting image with a projection optical axis with being tilted from normal to the screen, by designating arbitrary points as correction objects by an easy operation without independently providing a display and/or a pointing device.

BRIEF DESCRIPTION OF THE DRAWINGS

The above and other objects, advantages, and features of the present invention will be more apparent from the following description taken in conjunction with the accompanying drawings in which.

DETAILED DESCRIPTION OF THE PREFERRED EMBODIMENTS

Best modes of carrying out the present invention will be described in further detail using various embodiments with reference to the accompanying drawings.

Embodiment

Figure 2:
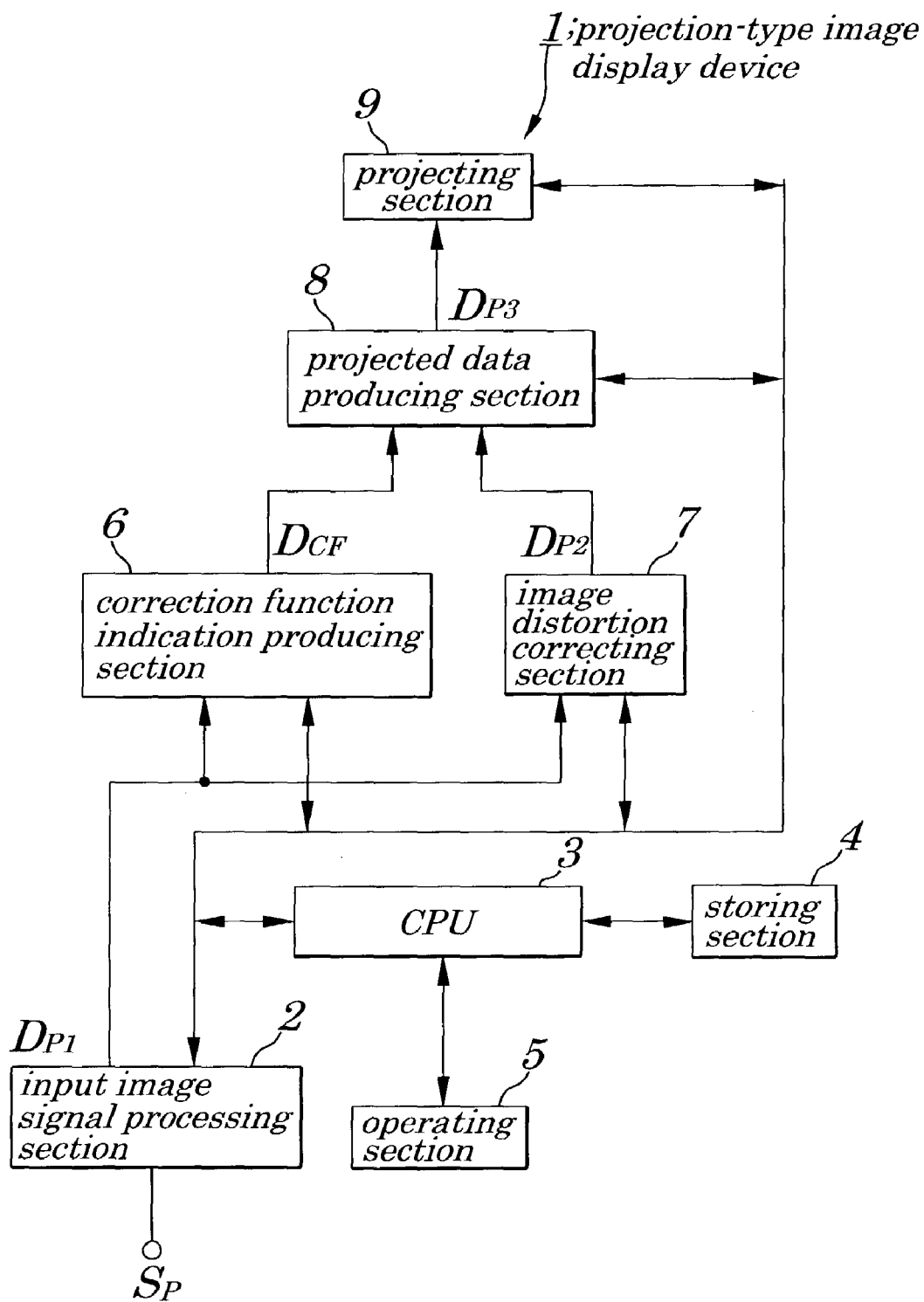
FIG. 2 is a schematic block diagram showing configurations of a projection-type image display device to which the method for correcting for the distortion of the projected image of the embodiment of the present invention is applied.

FIG. 2 is a schematic block diagram for showing configurations of a projection-type image display device 1 to which a method for correcting for distortion of projected image of an embodiment of the present invention is applied. The projection-type image display device 1 of the embodiment includes an input image signal processing section 2, a CPU (Central Processing Unit) 3, a storing section 4, an operating section 5, a correction function indication producing section 6, an image distortion correcting section 7, a projected data producing section 8, and a projecting section 9.

Figure 1:
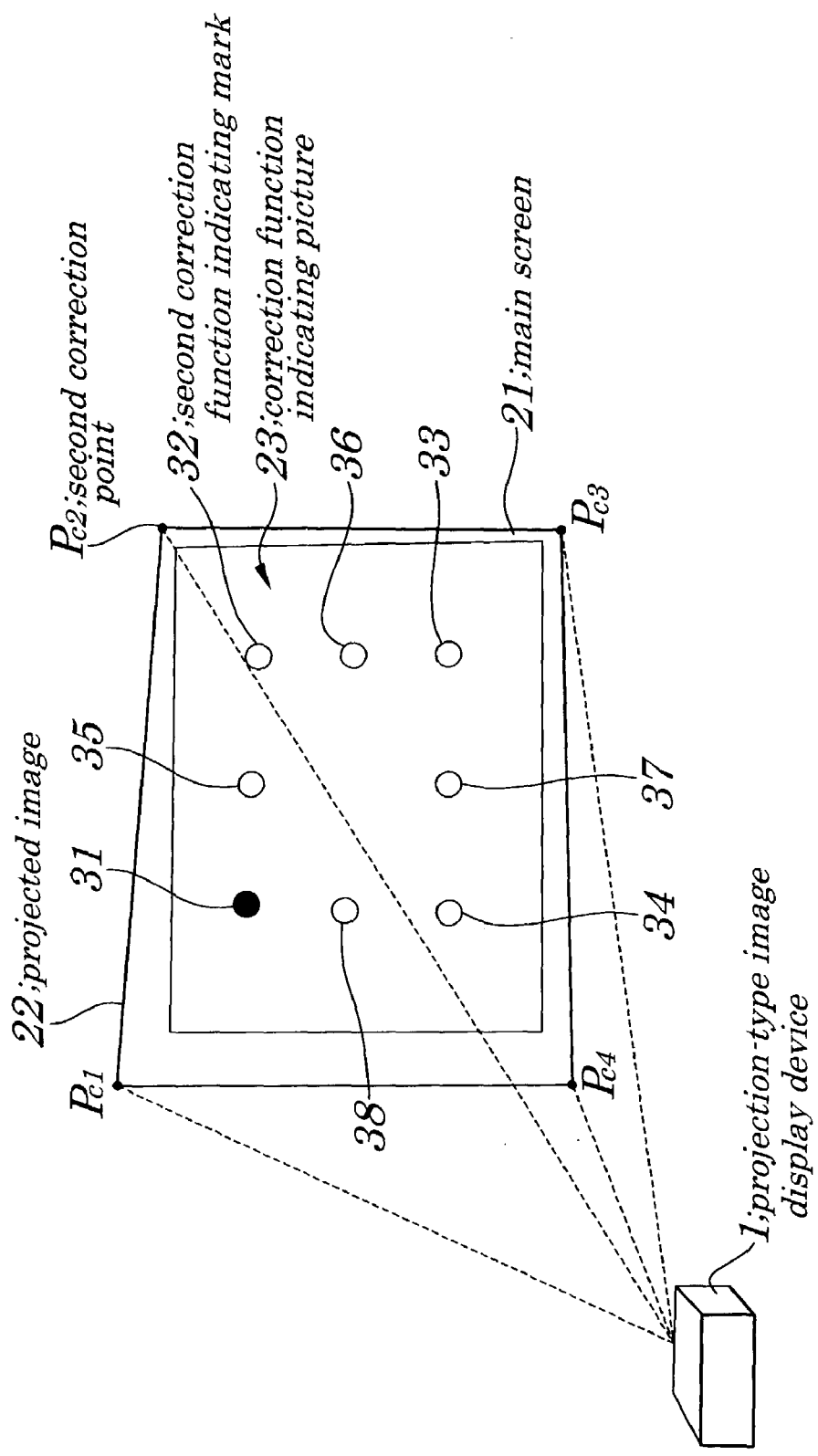
FIG. 1 is a perspective view illustrating projection of an image on a screen to explain a method for correcting for distortion of projected image according to an embodiment of the present invention.

The input image signal processing section 2, under control of the CPU 3, after having converted an analog image signal Sp fed from an outside to digital image data, performs an inverse gamma correction processing or a like on the converted data and feeds resulting data as image data Dp1 to the correction function indication producing section 6 and the image distortion correcting section 7. The CPU 3 executes various programs being stored in the storing section 4 and controls each component in the projection-type image display device 1 by using various registers and flags allocated in the storing section 4 and according to operator manipulation of various keys making up the operating section 5 in order to project an image onto a screen 21 (FIG. 1). As the storing section 4, a RAM (Random Access Memory), a ROM (Read Only Memory), a semiconductor memory such as a flash memory or a like, an FD (Flexible Disk), a HD (Hard Disk), an MO (Magneto-Optical) disk, a CD (Compact Disk)-ROM, a CD-R (Compact Disk-Recordable), a CD-RW (Compact Disk-Re-Writable), a DVD (Digital Video Disk)-ROM, a DVD-R (Digital Video Disk-Recordable), a DVD-RW (Digital Video Disk-Re-Writable), or a like are used. The storing section 4 stores, in addition to a main program used to display projected image on the screen 21 based on the analog image signal Sp fed from an outside, an image distortion correction program to correct for distortion of projected image caused by projecting an image with a projection optical axis being tilted from normal to the screen or a like (that is, being tilted from normal to the screen face or a like).

Figure 3:
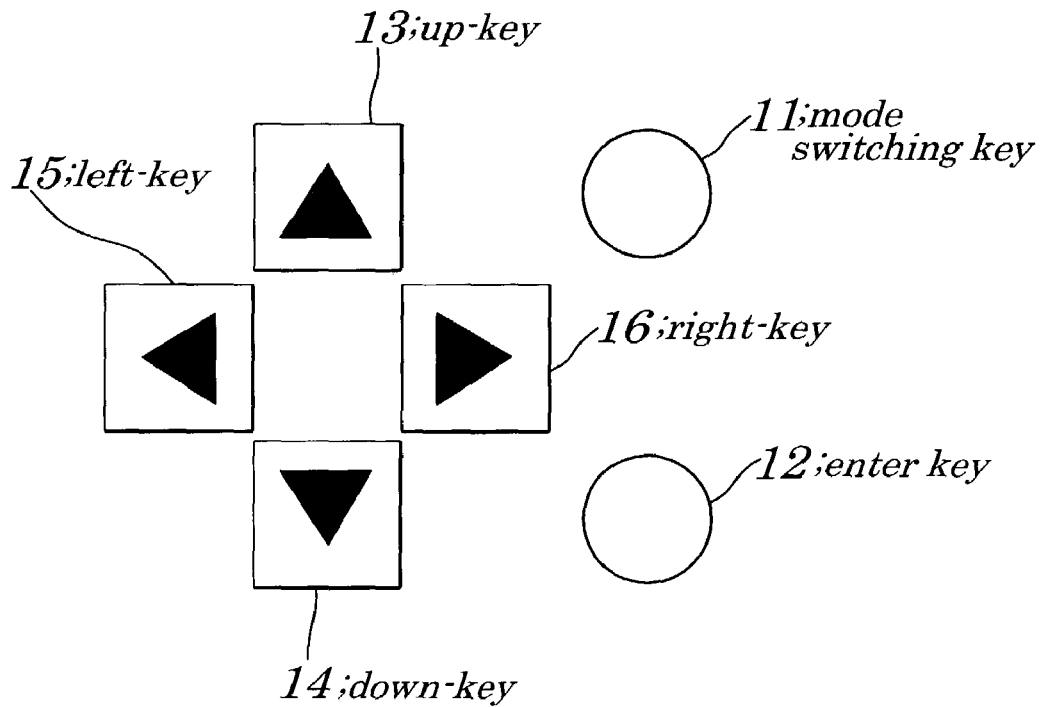
FIG. 3 is a front view for illustrating appearance configurations of various keys, each serving as part of an operating section in the projection-type image display device of the embodiment of the present invention.

The operating section 5 has, as shown in FIG. 3, for example, a mode switching key 11, an enter key 12, an up-key 13, a down-key 14, a left-key 15, a right-key 16, various switches such as a power switch or a like (not shown), a light receiving unit (not shown) to receive light signal fed from a remote controller (not shown), or a like. The operating section 5, by the operator manipulation of these various keys, various switches and/or the remote controller, feeds a signal corresponding to a type of each of the keys or switches, or a content of a light signal and depending on time while each of these keys or switches is pressed down to the CPU 3. The mode switching key 11 is used to indicate switching of an operation mode of the projection-type image display device 1 of the embodiment between a correction mode to correct for distortion of image and a normal mode to display projected image on the screen 21. The enter key 12 is used to designate, in a correction mode, switching of the correction mode between a selection mode to select one of eight correction functions being provided, in advance, to correct for distortion of projected image displayed on the screen 21 and an execution mode to execute the selected correction function. Here, the eight correction functions refer to first to eight correction functions which are described later in detail. Each of the up-key 13, the down-key 14, the left-key 15, and the right-key 15 is used to select one out of the eight correction functions in the above selection mode.

Moreover, the remote controller (not shown) described above is also provided with various keys having functions equal to those of the mode switching key 11, the enter key 12, the up-key 13, the down-key 14, the left-key 15, and the right-key 16. Therefore, each of the mode switching key 11, the enter key 12, the up-key 13, the down-key 14, the left-key 15, and the right-key 16 refers to either of those housed in a cabinet of the projection-type image display device 1 or those mounted in the remote controller.

The correction function indication producing section 6, under control of the CPU 3, produces correction function data $D_{CF}$ for a correction function indicating picture (not shown) to be used for correcting for distortion of a projected image displayed on the screen 21. The image distortion correcting section 7, under control of the CPU 3, produces an image data $D_{P2}$ obtained by correcting for distortion of projected image based on the image data $D_{P1}$ fed from the input image signal processing section 2. The projected data producing section 8, under control of the CPU 3, produces a final projected data $D_{P3}$ based on the correction function data $D_{CF}$ fed from the correction function indication producing section 6 or on the image data $D_{P2}$ fed from the image distortion correcting section 7. The projecting section 9 is generally made up of a display device, an optical lens, a light source (lamp), or a like (all not shown) and, after having modulated light emitted from a light source using the display device based on the final projected data $D_{P3}$ fed from the projected data producing section 8, by enlarging an image using the optical lens and by projecting the enlarged image onto the screen 21 to display an enlarged and projected video. As the display device, in general, devices such as a liquid crystal panel, a DLP (Digital Light Processing, a trademark of Texas Instruments U.S.A.) device, or a like are used in many cases. Here, the DLP is one of projection-type image displaying methods using a DMD (Digital Micromirror Device) developed by Texas Instruments U.S.A., in which an image is projected by controlling an orientation of each mirror contained in a device called the DMD being covered with several million pieces of small mirrors being 13 μm square to reflect light from a light source.

Next, operations of the projection-type image display device 1 of the embodiment of the present invention are described by referring to FIG. 1 to FIG. 6. Let it be assumed that the projection-type image display device 1 of the embodiment is put in a normal mode at its initial state. FIG. 1 is a diagrammatic sketch of a state in which the projection-type image display device 1 of the embodiment projects an image with a projection optical axis being tilted from normal to the screen 21. As is apparent from FIG. 1, a projected image 22 is distorted. First, an operator manipulates the mode switching key 11 to designate switching of an operation mode of the projection-type image display device 1 from the normal mode to the selection mode in the correction mode.

Thus, by the operator manipulation of the mode switching key 11, the operating section 5 feeds a signal corresponding to the mode switching key 11 to the CPU 3. Therefore, since the image distortion correction program is read into the CPU 3 from the storing section 4, the CPU 3, by control of the distortion correction program, controls the correction function indication producing section 6 to have it produce the correction function data $D_{CF}$ for a correction function indicating picture corresponding to the eight correction functions. Moreover, to simplify the description, concrete processing of the CPU 3 is not explained and manipulations of the operator are mainly described.

Figure 4:
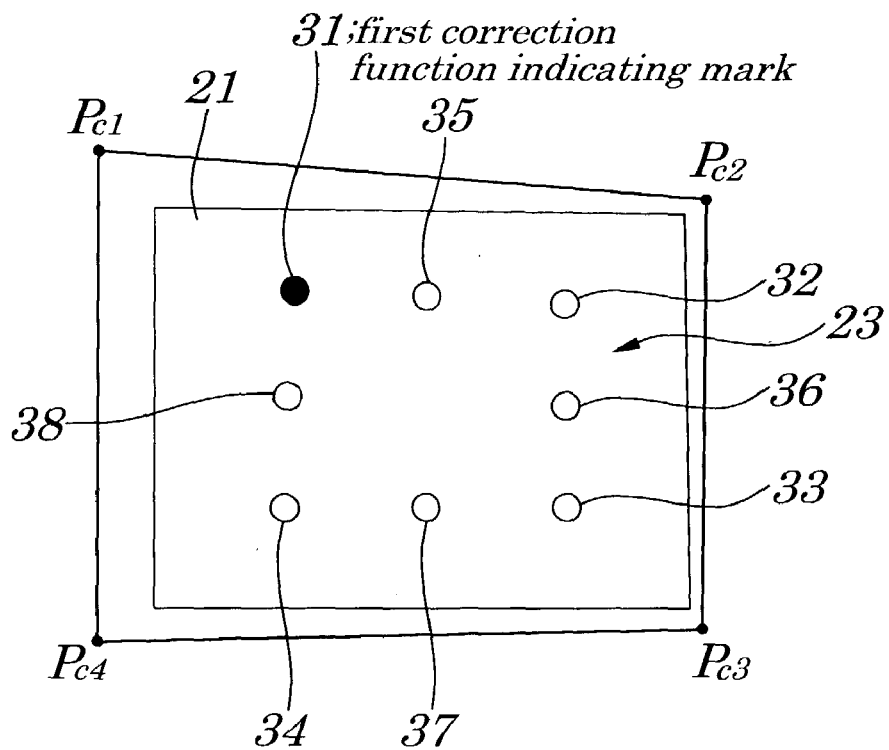
FIG. 4 is a diagrammatic sketch of operations for the method for correcting for the distortion of the projected image of the embodiment of the present invention.

As shown in FIG. 1 and FIG. 4, on the screen 21 is displayed a correction function indicating picture 23. The correction function indicating picture 23 as shown in FIG. 1 and FIG. 4 is made up of first to eighth (approximately circular) correction function indicating marks 31 to 38 located at four corners and approximately at a midpoint of each of four sides of a rectangle being geometrically similar to the rectangular screen 21 (its aspect ratio being 3:4 or 9:16). Each of the first to eighth correction function indicating marks 31 to 38 corresponds to each of the first to eighth correction functions described above. Here, the first to eighth functions are explained. The first correction function refers to a function of making corrections to a first correction point (a first specified point as correction object in the projected image) $P_{C1}$ shown in FIG. 1 and FIG. 4. Likewise, the second correction function refers to a function of making corrections to a second correction point (a second specified point as correction object in the projected image) $P_{C2}$ shown in FIG. 1 and FIG. 4. The third correction function refers to a function of making corrections to a third correction point (a third specified point as correction object in the projected image) $P_{C3}$ shown in FIG. 1 and FIG. 4. The fourth correction function refers to a function of making corrections to a fourth correction point (a fourth specified point as correction object in the projected image) $P_{C4}$ shown in FIG. 1 and FIG. 4.

On the other hand, the fifth correction function refers to a function of making simultaneous corrections to both the first correction point $P_{C1}$ and the second correction point $P_{C2}$. The sixth correction function refers to a function of making simultaneous corrections to both the second correction point $P_{C2}$ and the third correction point $P_{C3}$ The seventh correction function refers to a function of making simultaneous corrections to both the third correction point $P_{C3}$ and the fourth correction point $P_{C4}$. The eighth correction function refers to a function of making simultaneous corrections to both the fourth correction point $P_{C4}$ and the first correction point $P_{C1}$.

The operator can select one of correction functions out of the first to eighth correction functions by pressing down any one of the up-key 13, the down-key 14, the left-key 15, or the right-key 16. Then, when the operator presses down the enter key 12, an operation proceeds to an execution mode of a selected correction function and an object to be corrected is determined. In FIG. 1 and FIG. 4, the first correction function indicating mark 31 being filled in with black (that is, being displayed in a highlighted manner) represents that the first correction function is selected and the operation is put into the execution mode of the first function. An object to be corrected in this case is the first correction point $P_{C1}$.

Figure 5:
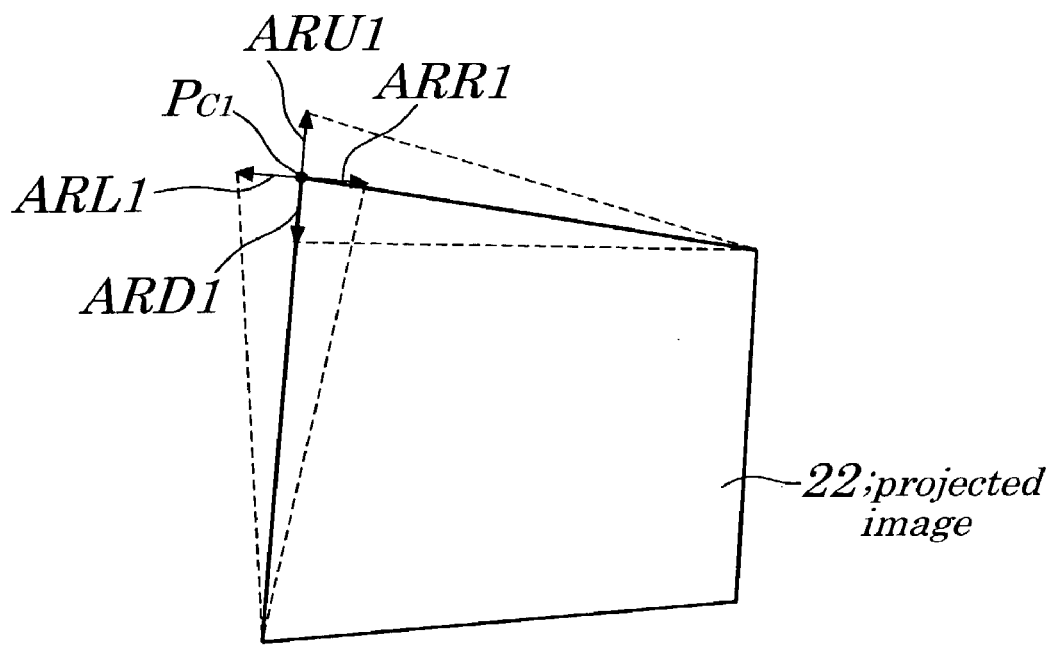
FIG. 5 is also a diagrammatic sketch of operations for the method for correcting for the distortion of the projected image of the embodiment of the present invention.

Moreover, FIG. 5 is a diagram illustrating directions in which corrections are made to the first correction point $P_{C1}$ being the first object to be corrected by the first correction function indicating mark 31 (FIG. 4). The operator, when moving the first correction point $P_{C1}$ to each of the directions in which a distortion correction is made, presses down any one of the up-key 13, the down-key 14, the left-key 15, or the right-key 16. That is, when the up-key 13 is pressed down one time, the first correction point $P_{C1}$ moves by a specified distance being in advance set toward a direction of an upward arrow ARU1 shown in FIG. 5, which causes a correction parameter corresponding to a moved distance to be calculated. Similarly, when the down-key 14 is pressed down one time, the first correction point $P_{C1}$ moves by a specified distance being in advance set toward a direction of a downward arrow ARD1 shown in FIG. 5, which causes a correction parameter corresponding to a moved distance to be calculated. When the left-key 15 is pressed down one time, the first correction point $P_{C1}$ moves by a specified distance being in advance set toward a direction of a leftward arrow ARL1 shown in FIG. 5, which causes a correction parameter corresponding to a moved distance to be calculated. When the right-key 15 is pressed down one time, the first correction point $P_{C1}$ moves by a specified distance being in advance set toward a direction of a rightward arrow ARR1 shown in FIG. 5, which causes a correction parameter corresponding to a moved distance to be calculated.

Likewise, in the second correction function, in order to move the second correction point $P_{C2}$ to each of directions in which the distortion correction is made, the operator performs processes described below. That is, the operator, after having switched an operation mode of the projection-type image display device 1 of the embodiment to the selection mode by pressing down the enter key 12, presses down any one of the up-key 13, the down-key 14, the left-key 15, or the right-key 16 to select the second correction function and then presses down the enter key 12 to put the selected second correction function into an execution mode and to have the second correction point $P_{C2}$ determined as an object to be corrected.

Next, the operator presses down any one of the up-key 13, the down-key 14, the left-key 15, or the right-key 16 to move the second correction point $P_{C2}$ toward each of directions in which the distortion correction is made. That is, when the up-key 13 is pressed down one time, the second correction point $P_{C2}$ moves by a specified distance being in advance set in an upward direction in FIG. 4, which causes a correction parameter corresponding to a moved distance to be calculated. Similarly, when the down-key 14 is pressed down one time, the second correction point $P_{C2}$ moves by a specified distance being in advance set in a downward direction in FIG. 4, which causes a correction parameter corresponding to a moved distance to be calculated. When the left-key 15 is pressed down one time, the second correction point $P_{C2}$ moves by a specified distance being in advance set in a leftward direction in FIG. 4, which causes a correction parameter corresponding to a moved distance to be calculated. When the right-key 16 is pressed down one time, the second correction point $P_{C2}$ moves by a specified distance being in advance set in a rightward direction in FIG. 4, which causes a correction parameter corresponding to a moved distance to be calculated.

In the third correction function, in order to move the third correction point $P_{C3}$ to each of directions in which the distortion correction is made, the operator performs processes described below. That is, the operator, after having switched an operation mode of the projection-type image display device 1 of the embodiment to the selection mode by pressing the enter key 12, presses down any one of the up-key 13, the down-key 14, the left-key 15, or the right-key 16 to select the third correction function and then presses down the enter key 12 to put the selected third correction function into an execution mode and to have the third correction point $P_{C3}$ determined as an object to be corrected.

Next, the operator presses down any one of the up-key 13, the down-key 14, the left-key 15, or the right-key 16 to move the third correction point $P_{C3}$ toward each of directions in which the distortion correction is made. That is, when the up-key 13 is pressed down one time, the third correction point $P_{C3}$ moves by a specified distance being in advance set in an upward direction in FIG. 4, which causes a correction parameter corresponding to a moved distance to be calculated. Similarly, when the down-key 14 is pressed down one time, the third correction point $P_{C3}$ moves by a specified distance being in advance set in a downward direction in FIG. 4, which causes a correction parameter corresponding to a moved distance to be calculated. When the left-key 15 is pressed down one time, the third correction point $P_{C3}$ moves by a specified distance being in advance set in a leftward direction in FIG. 4, which causes a correction parameter corresponding to a moved distance to be calculated. When the right-key 16 is pressed down one time, the third correction point $P_{C3}$ moves by a specified distance being in advance in a rightward direction in FIG. 4, which causes a correction parameter corresponding to a moved distance to be calculated.

In the fourth correction function, in order to move the fourth correction point $P_{C4}$ to each of directions in which the distortion correction is made, the operator performs processes described below. That is, the operator, after having switched an operation mode of the projection-type image display device 1 of the embodiment to the selection mode by pressing the enter key 12, presses down any one of the up-key 13, the down-key 14, the left-key 15, or the right-key 16 to select the fourth correction function and presses down the enter key 12 to put the selected fourth correction function into an execution mode and to have the fourth correction point $P_{C4}$ determined as an object to be corrected.

Next, the operator presses down any one of the up-key 13, the down-key 14, the left-key 15, or the right-key 16 to move the fourth correction point $P_{C4}$ toward each of directions in which the distortion correction is made. That is, when the up-key 13 is pressed down one time, the fourth correction point $P_{C4}$ moves by a specified distance being in advance set in an upward direction in FIG. 4, which causes a correction parameter corresponding to a moved distance to be calculated. Similarly, when the down-key 14 is pressed down one time, the fourth correction point $P_{C4}$ moves by a specified distance being in advance set in a downward direction in FIG. 4, which causes a correction parameter corresponding to a moved distance to be calculated. When the left-key 15 is pressed down one time, the fourth correction point $P_{C4}$ moves by a specified distance being in advance set in a leftward direction in FIG. 4, which causes a correction parameter corresponding to a moved distance to be calculated. When the right-key 16 is pressed down one time, the fourth correction point $P_{C4}$ moves by a specified distance being in advance in a rightward direction in FIG. 4, which causes a correction parameter corresponding to a moved distance to be calculated.

Figure 6:
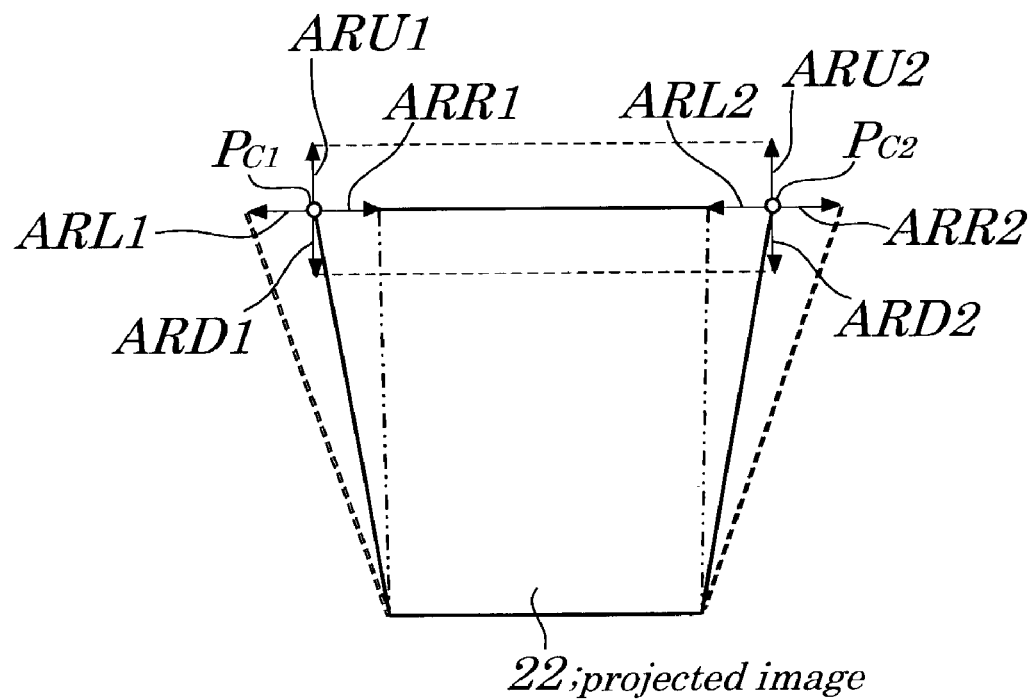
FIG. 6 is also a diagrammatic sketch of operations for the method for correcting for the distortion of the projected image of the embodiment of the present invention.

Next, FIG. 6 is a diagram illustrating directions in which corrections are made to the first correction point $P_{C1}$ and the second correction point $P_{C2}$ being objects to be corrected by the fifth correction function indicating mark 35 (FIG. 4). In the fifth correction function, in order to simultaneously move the first correction point $P_{C1}$ and second correction point $P_{C2}$ to each of directions in which the correction is made, the operator performs processes described below. That is, the operator, after having switched an operation mode of the projection-type image display device 1 of the embodiment to the selection mode by pressing the enter key 12, presses down any one of the up-key 13, the down-key 14, the left-key 15, or the right-key 16 to select the fifth correction function and then presses down the enter key 12 to put the selected fifth correction function into an execution mode and to have the first correction point $P_{C1}$ and the second correction point $P_{C2}$ determined as an object to be corrected.

Next, the operator presses down any one of the up-key 13, the down-key 14, the left-key 15, or the right-key 16 to simultaneously move the first correction point $P_{C1}$ and second correction point $P_{C2}$ toward each of directions in which the correction is made. That is, when the up-key 13 is pressed down one time, the first correction point $P_{C1}$ moves by a specified distance set in advance in a direction of an upward arrow ARU1 shown in FIG. 6 and only the moved distance is corrected and, at the same time, the second correction point $P_{C2}$ moves by a specified distance set in advance in a direction of an upward arrow ARU2 shown in FIG. 6, which causes a correction parameter corresponding to the moved distance to be calculated. Similarly, when the down-key 14 is pressed down one time, the first correction point $P_{C1}$ moves by a specified distance set in advance in a direction of a downward arrow ARD1 shown in FIG. 6, which causes a correction parameter corresponding to the moved distance to be calculated and, at the same time, the second correction point $P_{C2}$ moves by a specified distance set in advance in a direction of a downward arrow ARD2 shown in FIG. 6, which causes a correction parameter corresponding to the moved distance to be calculated. When the left-key 15 is pressed down one time, the first correction point $P_{C1}$ moves by a specified distance set in advance in a direction of a leftward arrow ARL1 shown in FIG. 6, which causes a correction parameter corresponding to the moved distance to be calculated and, at the same time, the second correction point $P_{C2}$ moves by a specified distance set in advance in a direction of a rightward arrow ARR2 shown in FIG. 6, which causes a correction parameter corresponding to the moved distance to be calculated. When the right-key 16 is pressed down one time, the first correction point $P_{C1}$ moves by a specified distance set in advance in a direction of a rightward arrow ARR1 shown in FIG. 6, which causes a correction parameter corresponding to the moved distance to be calculated and, at the same time, the second correction point $P_{C2}$ moves by a specified distance set in advance in a direction of a leftward arrow ARL2 shown in FIG. 6, which causes a correction parameter corresponding to the moved distance to be calculated.

Moreover, in the sixth correction function, in order to simultaneously move the second correction point $P_{C2}$ and third correction point $P_{C3}$ to each of directions in which the distortion correction is made, the operator performs processes described below. That is, the operator, after having switched an operation mode of the projection-type image display device 1 of the embodiment to the selection mode by pressing the enter key 12, presses down any one of the up-key 13, the down-key 14, the left-key 15, or the right-key 16 to select the sixth correction function and presses down the enter key 12 to put the selected sixth correction function into an execution mode and to have the second correction point $P_{C2}$ and third correction point $P_{C3}$ determined as an object to be corrected.

Next, the operator presses down any one of the up-key 13, the down-key 14, the left-key 15, or the right-key 16 to simultaneously move the second correction point $P_{C2}$ and third correction point $P_{C3}$ toward each of directions in which the distortion correction is made. That is, when the up-key 13 is pressed down one time, the second correction point $P_{C2}$ moves by a specified distance set in advance in an upward direction in FIG. 4 which causes a correction parameter corresponding to the moved distance to be calculated and, at the same time, the third correction point $P_{C3}$ moves by a specified distance set in advance in a downward direction in FIG. 4, which causes a correction parameter corresponding to the moved distance to be calculated. Similarly, when the down-key 14 is pressed down one time, the second correction point $P_{C2}$ moves by a specified distance set in advance in a downward direction in FIG. 4 which causes a correction parameter corresponding to the moved distance to be calculated and, at the same time, the third correction point $P_{C3}$ moves by a specified distance set in advance in an upward direction in FIG. 4, which causes a correction parameter corresponding to the moved distance to be calculated. When the left-key 15 is pressed down one time, the second correction point $P_{C2}$ moves by a specified distance set in advance in a leftward direction in FIG. 4 which causes a correction parameter corresponding to the moved distance to be calculated and, at the same time, the third correction point $P_{C3}$ moves by a specified distance set in advance in a leftward direction in FIG. 4, which causes a correction parameter corresponding to the moved distance to be calculated. When the right-key 16 is pressed down one time, the second correction point $P_{C2}$ moves by a specified distance set in advance in a rightward direction in FIG. 4 which causes a correction parameter corresponding to the moved distance to be calculated and, at the same time, the third correction point $P_{C3}$ moves by a specified distance set in advance in a rightward direction in FIG. 4, which causes a correction parameter corresponding to the moved distance to be calculated.

Also, in the seventh correction function, in order to simultaneously move the third correction point $P_{C3}$ and fourth correction point $P_{C4}$ to each of directions in which the distortion correction is made, the operator performs processes described below. That is, the operator, after having switched an operation mode of the projection-type image display device 1 of the embodiment to the selection mode by pressing the enter key 12, presses down any one of the up-key 13, the down-key 14, the left-key 15, or the right-key 16 to select the seventh correction function and then presses down the enter key 12 to put the selected seventh correction function into an execution mode and to have the third correction point $P_{C3}$ and fourth correction point $P_{C4}$ determined as objects to be corrected.

Next, the operator presses down any one of the up-key 13, the down-key 14, the left-key 15, or the right-key 16 to simultaneously move the third correction point $P_{C3}$ and fourth correction point $P_{C4}$ to each of directions in which the distortion correction is made. That is, when the up-key 13 is pressed down one time, the third correction point $P_{C3}$ moves by a specified distance set in advance in an upward direction in FIG. 4 which causes a correction parameter corresponding to the moved distance to be calculated and, at the same time, the fourth correction point $P_{C4}$ moves by a specified distance set in advance in an upward direction in FIG. 4, which causes a correction parameter corresponding to the moved distance to be calculated. Similarly, when the down-key 14 is pressed down one time, the third correction point $P_{C3}$ moves by a specified distance set in advance in a downward direction in FIG. 4 which causes a correction parameter corresponding to the moved distance to be calculated and, at the same time, the fourth correction point $P_{C4}$ moves by a specified distance set in advance in a downward direction in FIG. 4, which causes a correction parameter corresponding to the moved distance to be calculated. When the left-key 15 is pressed down one time, the third correction point $P_{C3}$ moves by a specified distance set in advance in a rightward direction in FIG. 4 which causes a correction parameter corresponding to the moved distance to be calculated and, at the same time, the fourth correction point $P_{C4}$ moves by a specified distance set in advance in a leftward direction in FIG. 4, which causes a correction parameter corresponding to the moved distance to be calculated. When the right-key 16 is pressed down one time, the third correction point $P_{C3}$ moves by a specified distance set in advance in a leftward direction in FIG. 4 which causes a correction parameter corresponding to the moved distance to be calculated and, at the same time, the fourth correction point $P_{C4}$ moves by a specified distance set in advance in a rightward direction in FIG. 4, which causes a correction parameter corresponding to the moved distance to be calculated.

Furthermore, in the eighth correction function, in order to simultaneously move the fourth correction point $P_{C4}$ and first correction point $P_{C1}$ to each of directions in which the distortion correction is made, the operator performs processes described below. That is, the operator, after having switched the operation mode of the projection-type image display device 1 of the embodiment to the selection mode by pressing the enter key 12, presses down any one of the up-key 13, the down-key 14, the left-key 15, or the right-key 16 to select the eighth correction function and then presses down the enter key 12 to put the selected eighth correction function into an execution mode and to have the fourth correction point $P_{C4}$ and the first correction point $P_{C1}$ determined as objects to be corrected.

Next, the operator presses down any one of the up-key 13, the down-key 14, the left-key 15, or the right-key 16 to simultaneously move the fourth correction point $P_{C4}$ and first correction point $P_{C1}$ to each of directions in which the distortion correction is made. That is, when the up-key 13 is pressed down one time, the fourth correction point $P_{C4}$ moves by a specified distance set in advance in a downward direction in FIG. 4 which causes a correction parameter corresponding to the moved distance to be calculated, and, at the same time, the first correction point $P_{C1}$ moves by a specified distance set in advance in an upward direction in FIG. 4, which causes a correction parameter corresponding to the moved distance to be calculated. Similarly, when the down-key 14 is pressed down one time, the fourth correction point $P_{C4}$ moves by a specified distance set in advance in an upward direction in FIG. 4 which causes a correction parameter corresponding to the moved distance to be calculated and, at the same time, the first correction point $P_{C1}$ moves by a specified distance set in advance in a downward direction in FIG. 4, which causes a correction parameter corresponding to the moved distance to be calculated. When the left-key 15 is pressed down one time, the fourth correction point $P_{C4}$ moves by a specified distance set in advance in a leftward direction in FIG. 4 which causes a correction parameter corresponding to the moved distance to be calculated and, at the same time, the first correction point $P_{C1}$ moves by a specified distance set in advance in a leftward direction in FIG. 4, which causes a correction parameter corresponding to the moved distance to be calculated. When the right-key 16 is pressed down one time, the fourth correction point $P_{C4}$ moves by a specified distance set in advance in a rightward direction in FIG. 4 which causes a correction parameter corresponding to the moved distance to be calculated and, at the same time, the first correction point $P_{C1}$ moves by a specified distance set in advance in a rightward direction in FIG. 4, which causes a correction parameter corresponding to the moved distance to be calculated.

The CPU 3 stores all correction parameters calculated according to processing described above in the storing section 4. Then, the CPU 3 controls the image distortion correcting section 7 based on a correction parameter being stored in the storing section 4 to correct for distortion of projected image data made up of the image data $D_{P1}$ fed from the input image signal processing section 2 and to produce the image data $D_{P2}$ and then transmits corrected image through the projected data producing section 8 and the projecting section 9 to display the image on the screen 21.

Thus, according to the projection-type image display device 1 of the embodiment, the operator, by displaying correction function indicating pictures corresponding to the eight correction functions installed in advance to correct for distortion of projected image on the screen 21 and by manipulating the up-key 13, the down-key 14, the left-key 15, or the right-key 16, can make corrections to each of the correction points. Therefore, without need of independently providing a display and/or a pointing device or a table used to operate the pointing device, it is possible to place the projection-type image display device 1 at an arbitrary location, to decrease a parts count, and to designate arbitrary correction points by an easy operation to correct for distortion of image.

It is apparent that the present invention is not limited to the above embodiments but may be changed and modified without departing from the scope and spirit of the invention. For example, in the above embodiment, a case is described where any one of the up-key 13, the down-key 14, the left-key 15, or the right-key 16 is pressed down, which causes correction points to be moved by a specified distance being set in advance and gets a correction parameter corresponding to the moved distance to be calculated. However, the present invention is not limited to this. The projection-type image display device may be so configured that a correction distance changes depending on time during which the up-key 13, the down-key 14, the left-key 15, or the right-key 16 is being pressed down.

Moreover, in the projection-type image display device 1 of the above embodiment, light signals are output from the remote controller to the operating section 5. However, the present invention is not limited to this. That is, the projection-type image display device 1 may be so configured that a radio wave is emitted from the remote controller to the operating section 5 and the operating section 5 receives the radio wave and converts the received radio wave to an electrical signal.

Also, in the fifth correction function of the above embodiment, when the left-key 15 is pressed down, the first correction point $P_{C1}$ moves leftward and is corrected and, at the same time, the second correction point $P_{C2}$ moves rightward and is corrected and, when the right-key 16 is pressed down, the first correction point $P_{C1}$ moves rightward and is corrected and the second correction point $P_{C2}$ moves leftward and is corrected. However, the present invention is not limited to this. That is, the fifth correction function may be configured so that, when the left-key 15 is pressed down, the first correction point $P_{C1}$ moves rightward and is corrected and, at the same time, the second correction point $P_{C2}$ moves leftward and is corrected and, when the right-key 16 is pressed down, the first correction point $P_{C1}$ moves leftward and is corrected and, at the same time, the second correction point $P_{C2}$ moves rightward and is corrected. In this case also, same effects as those in the above embodiment can be obtained.

Likewise, in the sixth correction function of the above embodiment, when the up-key 13 is pressed down, the second correction point $P_{C2}$ moves upward and is corrected and, at the same time, the third correction point $P_{C3}$ moves downward and is corrected and, when the down-key 14 is pressed down, the second correction point $P_{C2}$ moves downward and is corrected and, at the same time, the third correction point $P_{C3}$ moves upward and is corrected. However, the present invention is not limited to this. That is, the sixth correction function may be configured so that, when the up-key 13 is pressed down, the second correction point $P_{C2}$ moves downward and is corrected and, at the same time, the third correction point $P_{C3}$ moves upward and is corrected and, when the down-key 14 is pressed down, the second correction point $P_{C2}$ moves upward and is corrected and, at the same time, the third correction point $P_{C3}$ moves downward and is corrected and, at the same time, the third correction point $P_{C3}$ moves downward and is corrected. In this case also, same effects as those in the above embodiment can be obtained.

Also, in the seventh correction function of the above embodiment, when the left-key 15 is pressed down, the third correction point $P_{C3}$ moves rightward and is corrected and, at the same time, the fourth correction point $P_{C4}$ moves leftward and is corrected and, when the right-key 16 is pressed down, the third correction point $P_{C3}$ moves leftward and is corrected and, at the same time, the fourth correction point $P_{C3}$ moves rightward and is corrected. However, the present invention is not limited to this. That is, the seventh correction function may be configured so that, when the left-key 15 is pressed down, the third correction point $P_{C3}$ moves leftward and is corrected and, at the same time, the fourth correction point $P_{C4}$ moves rightward and is corrected and, when the right-key 16 is pressed down, the third correction point $P_{C3}$ moves rightward and is corrected and, at the same time, the fourth correction point $P_{C4}$ moves leftward and is corrected. In this case also, same effects as those in the above embodiment can be obtained.

Also, in the eighth correction function of the above embodiment, when the up-key 13 is pressed down, the fourth correction point $P_{C4}$ moves downward and is corrected and, at the same time, the first correction point $P_{C1}$ moves upward and is corrected and, when the down-key 14 is pressed down, the fourth correction point $P_{C4}$ moves upward and is corrected and, at the same time, the first correction point $P_{C1}$ moves downward and is corrected. However, the present invention is not limited to this. That is, the eighth correction function may be configured so that, when the up-key 13 is pressed down, the fourth correction point $P_{C4}$ moves upward and is corrected and, at the same time, the first correction point $P_{C1}$ moves downward and is corrected and, when the down-key 14 is pressed down, the fourth correction point $P_{C4}$ moves downward and is corrected and, at the same time, the first correction point $P_{C1}$ moves upward and is corrected. In this case also, same effects as those in the above embodiment can be obtained.

Also, in the above embodiment, distortion of projected image are corrected for by the first to eighth correction functions. However, the projection-type image display device 1 may be so configured that distortion of projected image are corrected by either of a function group of the first to fourth correction functions or of a function group of the fifth to eighth correction functions, or by correction functions other than these function groups. In this case also, same effects as those in the above embodiment can be obtained. Also, in the above embodiment, the correction function indicating picture 23 is displayed on the screen 21. However, a lattice-formed or checkered correction function indicating picture may be displayed on the screen 21. In this case also, same effects as those in the above embodiment can be obtained.

Also, in the above embodiment, when the operator manipulates the up-key 13, the down-key 14, the left-key 15, or the right-key 16, each of corresponding correction points is corrected. However, the projection-type image display device 1 may be so configured that, when the operator manipulates the up-key 13, the down-key 14, the left-key 15, or the right-key 16, only a correction contour frame obtained by connecting the first to fourth correction function indicating marks 31 to 34 is moved and, when the operator manipulates the mode switching key 11, actual correction processing is performed. In this case also, same effects as those in the above embodiment can be obtained.

Furthermore, in the above embodiment, the correction function indication producing section 6, image distortion correcting section 7, and the projected data producing section 8 are constructed of hardware. However, the present invention is not limited to this. That is, functions to be achieved by the correction function indication producing section 6, the image distortion correcting section 7, and the projected data producing section 8 may be stored in the storing section 4 in a form of a program which is read in from the storing section 4 to the CPU 3 to control the CPU 3. The CPU 3, when the above program is executed, serves as the correction function indication producing section 6, the image distortion correcting section 7, and the projected data producing section 8 and performs the above processing under control of the program. Distortion of a rectangular image is not limited to trapezoidal distortion.

What is claimed is:

1. A method for correcting distortion of an image projected with a projection optical axis being tilted from normal to a screen, said method comprising:
   displaying a plurality of correction function indicating marks corresponding to a plurality of correction functions to make corrections to specified points in said projected image;
   selecting at least one of said correction function indicating marks;
   calculating a correction parameter corresponding to a range of motion for making a correction to at least one specified point corresponding to the selected correction function indicating mark; and
   correcting said image based on said correction parameter.

2. The method according to claim 1,
   wherein said specified points comprise first to fourth specified points, each corresponding to a respective one of the four corners of said image, and
   wherein said plurality of correction functions comprises first to fourth correction functions which correspond to said first to fourth specified points, respectively, and
   said plurality of correction function indicating marks comprises first to fourth correction function indicating marks, each being located at a respective corner of a figure which is geometrically similar to said image and each corresponding to a respective one of said first to fourth correction functions.

3. The method according to claim 1, wherein said image is rectangular and said distortion is trapezoidal.

4. The method according to claim 2, wherein said plurality of correction functions further comprises a fifth correction function corresponding to said first and second specified points, a sixth correction function corresponding to said second and third specified points, a seventh correction function corresponding to said third and fourth specified points, and an eighth correction function corresponding to said fourth and first specified points, and
   wherein said plurality of correction function indicating marks further comprises
   a fifth correction function indicating mark located between said first corner and said second corner of said figure and corresponding to said fifth correction function,
   a sixth correction function indicating mark located between said second corner and said third corner of said figure and corresponding to said sixth correction function,
   a seventh correction function indicating mark located between said third corner and said fourth corner of said figure and corresponding to said seventh correction function, and
   an eighth correction function indicating mark located between said fourth corner and said first corner of said figure and corresponding to said eighth correction function,
   said method further comprising:
   if said fifth correction function indicating mark is selected, calculating the correction parameter corresponding to a range of motion for making a correction to the first and second specified points corresponding to the fifth correction function indicating mark;
   if said sixth correction function indicating mark is selected, calculating the correction parameter corresponding to a range of motion for making a correction to the second and third specified points corresponding to the sixth correction function indicating mark;
   if said seventh correction function indicating mark is selected, calculating the correction parameter corresponding to a range of motion for making a correction to the third and fourth specified points corresponding to the seventh correction function indicating mark, and
   if said eighth correction function indicating mark is selected, calculating the correction parameter corresponding to a range of motion for making a correction to the fourth and first specified points corresponding to the eighth correction function indicating mark.

5. The method according to claim 1, wherein the range of motion is indicated using cursor keys, which are placed in a housing of an image display device used to project said image on said screen or in a remote controller.

6. A distortion correction program to have a computer perform a method for correcting distortion of an image projected with a projection optical axis being tilted from normal to a screen, said method comprising:

displaying a plurality of correction function indicating marks corresponding to a plurality of correction functions to make corrections to specified points as correction objects in said projected image;

selecting at least one of said correction function indicating marks;

calculating a correction parameter corresponding to a range of motion for making a correction to at least one specified point corresponding to the selected correction function indicating mark; and correcting said image based on said correction parameter.

7. A projection-type image display device comprising:

an operating unit which has a plurality of cursor keys;

a displaying unit which displays, on a screen, a plurality of correction function indicating marks corresponding to a plurality of correction functions to make corrections to specified points in said projected image, said plurality of correction function indicating marks used to correct distortion of an image projected with a projection optical axis being tilted from normal to said screen;

a controlling unit which controls said displaying unit to select at least one of said correction function indicating marks and to, in based on instructions from a cursor key of said cursor keys, calculate a correction parameter corresponding to a range of motion for making a correction to at least one specified point corresponding to the selected correction function indicating mark; and a correcting unit which corrects said image based on said correction parameters.

8. The projection-type image display device according to claim 7, wherein said specified points comprise first to fourth specified points, each corresponding to a respective one of the four corners of said image and wherein said plurality of correction functions comprises first to fourth correction functions which correspond to said first to fourth specified points, respectively, and said plurality of correction function indicating marks comprises first to fourth correction function indicating marks, each being located at a respective corner of a figure which is geometrically similar to said image and each corresponding to a respective one of said first to fourth correction functions.

9. The projection-type image display device according to claim 7, wherein said image is rectangular image and said distortion is trapezoidal.

10. The projection-type image display device according to claim 8, wherein said plurality of correction functions comprises a fifth correction function corresponding to said first and second specified points, a sixth correction function corresponding to said second and third specified points, a seventh correction function corresponding to said third and fourth specified points, and an eighth correction function corresponding to said fourth and first specified points, and wherein said plurality of correction function indicating marks further comprises a fifth correction function indicating mark located between said first corner and said second corner of said figure and corresponding to said fifth correction function, a sixth correction function indicating mark located between said second corner and said third corner of said figure and corresponding to said sixth correction function, a seventh correction function indicating mark located between said third corner and said fourth corner of said figure and corresponding to said seventh correction function, and an eighth correction function indicating mark located between said fourth corner and said first corner of said figure and corresponding to said eighth correction function, said method further comprising:

if said fifth correction function indicating mark is selected, calculating the correction parameter corresponding to a range of motion for making a correction to the first and second specified points corresponding to the fifth correction function indicating mark;

if said sixth correction function is selected, calculating a correction parameter corresponding to a range of motion for making a correction to the second and third specified points corresponding to the sixth correction function indicating mark;

if said seventh correction function is selected, calculating a correction parameter corresponding to a range of motion for making a correction to the third and fourth specified points corresponding to the seventh correction function indicating mark; and if said eighth correction function is selected, calculating a correction parameter corresponding to a range of motion for making a correction to the fourth and first specified points corresponding to the eighth correction function indicating mark.

11. The method according to claim 1, wherein calculating the correction parameter further includes calculating the correction parameter corresponding to a range of motion for making a correction to a plurality of specified points corresponding to the selected correction function indicating mark.

12. The distortion correction program according to claim 6, wherein calculating the correction parameter further includes calculating the correction parameter corresponding to a range of motion for making a correction to a plurality of specified points corresponding to the selected correction function indicating mark.

13. The projection-type image display device according to claim 7, wherein the controlling unit calculates the correction parameter corresponding to a range of motion for making a correction to a plurality of specified points corresponding to the selected correction function indicating mark.

14. A method for correcting distortion of an image, the method comprising:

displaying an image;

displaying a correction function display comprising a plurality of marks, each mark corresponding to at least one of a plurality of correction points on said image and designating a corresponding correction function;

selecting one of the plurality of marks;

calculating a correction parameter based on the selected mark and a range of motion corresponding to a desired correction to at least one correction point on said image; and modifying the image data based on the calculated correction parameter.

* * * * *